United States Patent
Siudzinski et al.

(10) Patent No.: US 10,203,143 B2
(45) Date of Patent: Feb. 12, 2019

(54) WRINKLE FREE GEOMETRIC OPENING IN A VACUUM INSULATED PANEL

(71) Applicant: DOUBLEDAY ACQUISITIONS LLC, Dayton, OH (US)

(72) Inventors: Paul A. Siudzinski, Springboro, OH (US); Steven R. Eakins, Troy, OH (US); Ross A. Moreland, Vandalia, OH (US)

(73) Assignee: DOUBLEDAY ACQUISITIONS LLC, Dayton, OH (US)

( * ) Notice: Subject to any disclaimer, the term of this patent is extended or adjusted under 35 U.S.C. 154(b) by 44 days.

(21) Appl. No.: 15/645,373

(22) Filed: Jul. 10, 2017

(65) Prior Publication Data

US 2017/0307279 A1   Oct. 26, 2017

Related U.S. Application Data

(63) Continuation of application No. 14/178,335, filed on Feb. 12, 2014, now Pat. No. 9,733,006.

(Continued)

(51) Int. Cl.
   *F25D 11/00*   (2006.01)
   *B32B 37/00*   (2006.01)
   (Continued)

(52) U.S. Cl.
   CPC ........ *F25D 11/003* (2013.01); *B32B 37/0007* (2013.01); *B32B 37/0023* (2013.01);
   (Continued)

(58) Field of Classification Search
   CPC .... F25D 11/003; F25D 11/00; F25D 2201/14; B32B 37/00; B32B 37/0007;
   (Continued)

(56) References Cited

U.S. PATENT DOCUMENTS

| 5,187,947 A | 2/1993 | Breunig et al. |
| 5,483,799 A | 1/1996 | Dalto |

(Continued)

FOREIGN PATENT DOCUMENTS

| JP | 2004-011861 A | 1/2004 |
| JP | 2006-118639 A | 5/2006 |

OTHER PUBLICATIONS

Extended European Search Report dated Jan. 25, 2018 for Application No. EP 17193528.1, 10 pages.

(Continued)

*Primary Examiner* — Jacob T Minskey
*Assistant Examiner* — Matthew Hoover
(74) *Attorney, Agent, or Firm* — Frost Brown Todd, LLC

(57) ABSTRACT

At least one puck is used to manufacture a vacuum insulated panel with a shaped opening. A pair of barrier films are positioned about an insulated core having a shaped opening such as a through bore, cutout, or relief. The puck includes a protrusion having a shape similar to that of the opening of the insulated core. With the barrier films positioned about the insulated core, the pucks are inserted into the opening from opposite sides of the insulated core to thereby compress the barrier films between the shaped protrusions of the pucks to thereby prevent wrinkles and/or creases in the barrier films. The insulated core is then subjected to a vacuum to evacuate the insulated core of any gases and the barrier films are heat sealed to maintain the insulated core in the evacuated state. Excess barrier film is then removed to provide a wrinkle and/or crease free seal.

8 Claims, 17 Drawing Sheets

Related U.S. Application Data

(60) Provisional application No. 61/763,537, filed on Feb. 12, 2013.

(51) Int. Cl.
*B65D 81/00* (2006.01)
*F16L 59/00* (2006.01)
*B32B 37/10* (2006.01)
*B32B 37/18* (2006.01)
*F16L 59/065* (2006.01)

(52) U.S. Cl.
CPC ...... *B32B 37/0046* (2013.01); *B32B 37/1018* (2013.01); *B32B 37/185* (2013.01); *B32B 2307/304* (2013.01); *B32B 2309/68* (2013.01); *F16L 59/065* (2013.01); *F25D 2201/14* (2013.01); *Y10T 156/108* (2015.01)

(58) Field of Classification Search
CPC ............ B32B 37/0023; B32B 37/0046; B32B 37/1018; B32B 2307/304; B32B 2309/68; B32B 37/185; B65D 81/00; B65D 81/38; F16L 59/00; F16L 59/06; F16L 59/065; Y10T 156/108
See application file for complete search history.

(56) References Cited

U.S. PATENT DOCUMENTS

| | | |
|---|---|---|
| 5,603,220 A | 2/1997 | Seaman |
| 5,943,876 A | 8/1999 | Meyer et al. |
| 5,950,450 A | 9/1999 | Meyer et al. |
| 6,860,115 B2 | 3/2005 | Norelius et al. |
| 6,881,358 B1 | 4/2005 | Clark et al. |
| 7,913,511 B2 | 3/2011 | Meyer et al. |
| 2004/0074208 A1* | 4/2004 | Olson ............... B65D 81/3823 52/794.1 |
| 2004/0226309 A1 | 11/2004 | Broussard |
| 2006/0076863 A1* | 4/2006 | Echigoya ............ F16L 59/04 312/401 |

OTHER PUBLICATIONS

Partial European Search Report dated May 6, 2014 for Application No. EP 14154915.4, 5 pgs.
Partial European Search Report dated Oct. 1, 2014 for Application No. EP 14154915.4, 5 pgs.
European Search Report and Written Opinion dated Oct. 15, 2014 for Application No. EP 14154915.4, 8 pgs.
European Communication dated May 31, 2016 for Application No. EP 14154915.4, 6 pgs.
"Hockey puck," Wikipedia, Dec. 12, 2011, XP002729686, Retrieved from the Internet: http://web.archive.org/web/20111206153256/http://en.wikipedia.org/wild/Hockey_puck.
"Equipment for the Underwater Hockey player," Jun. 20, 2012, Retrieved from the Internet: http://web.archive.org/web/20120620193229/http://www/uwhockey.org/colorado/Equipment.html.
U.S. Appl. No. 60/447,987, filed Feb. 17, 2003.

* cited by examiner

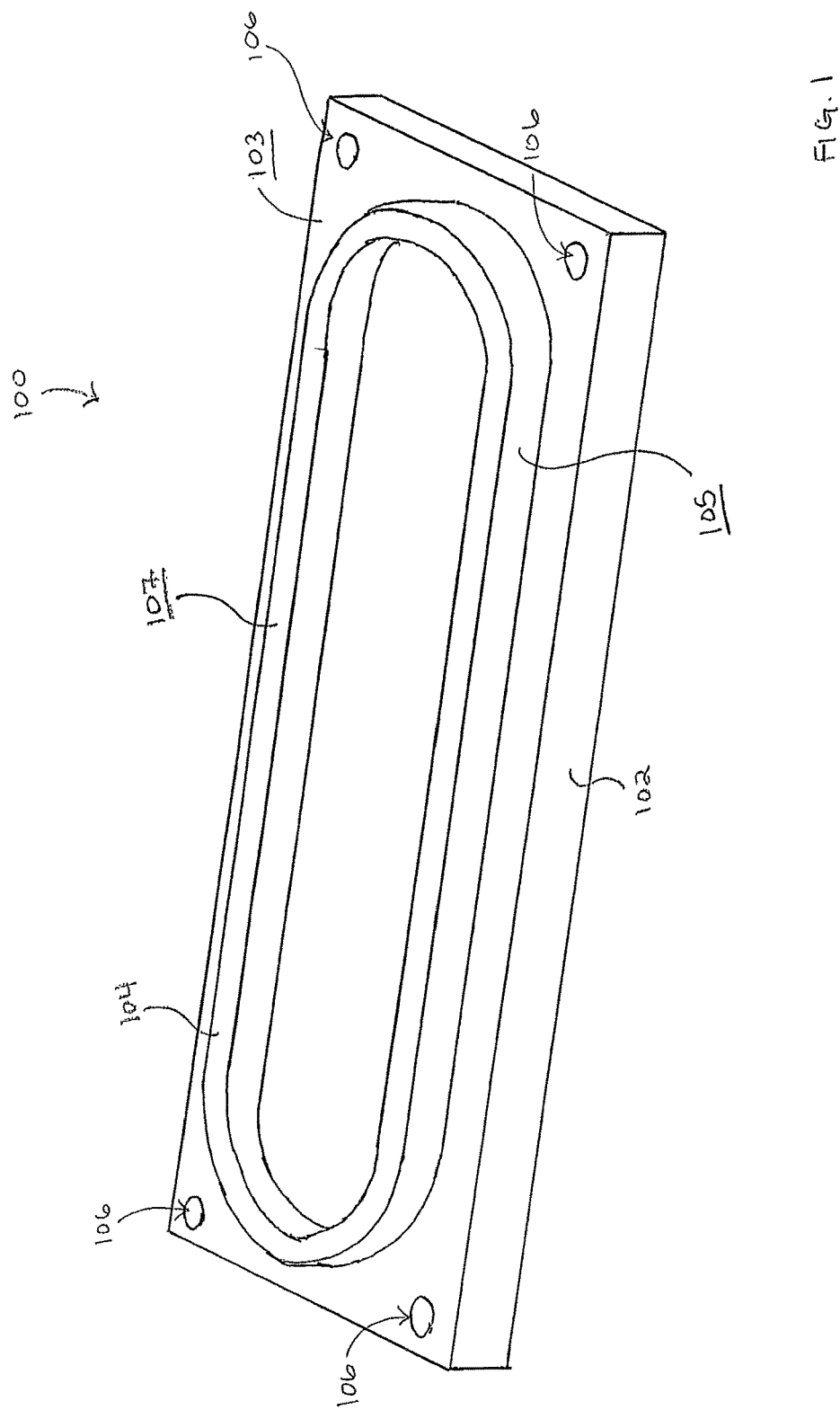

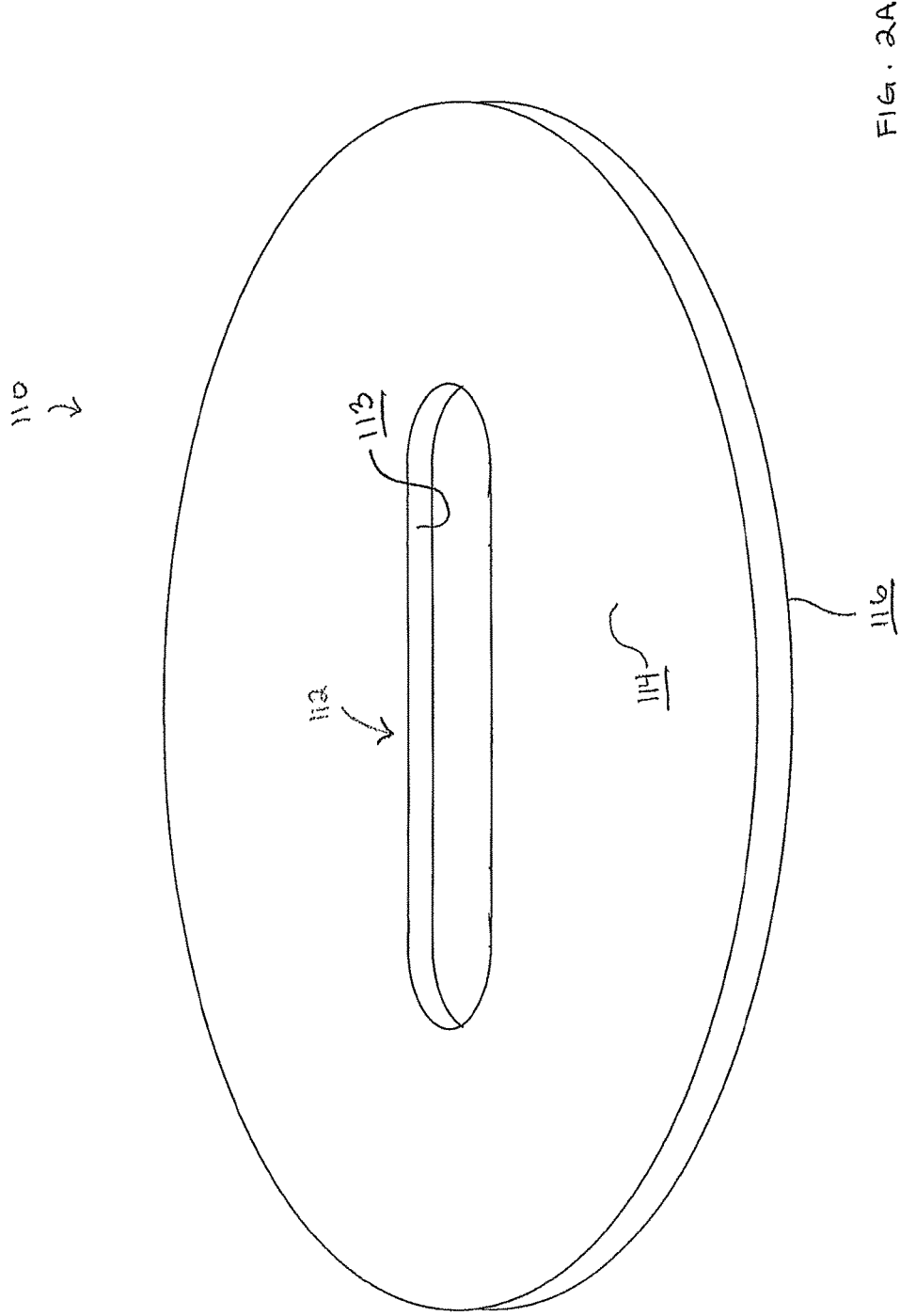

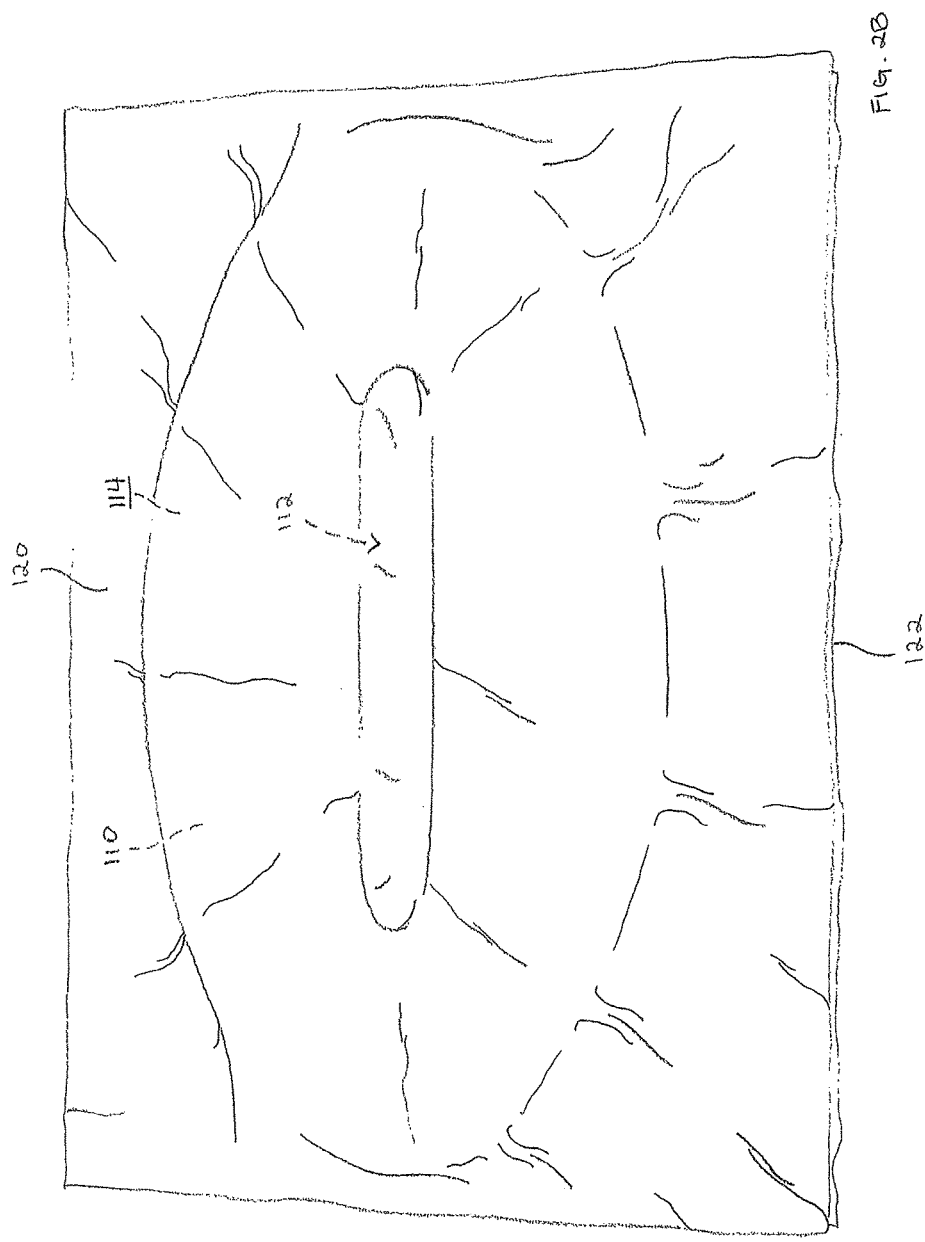

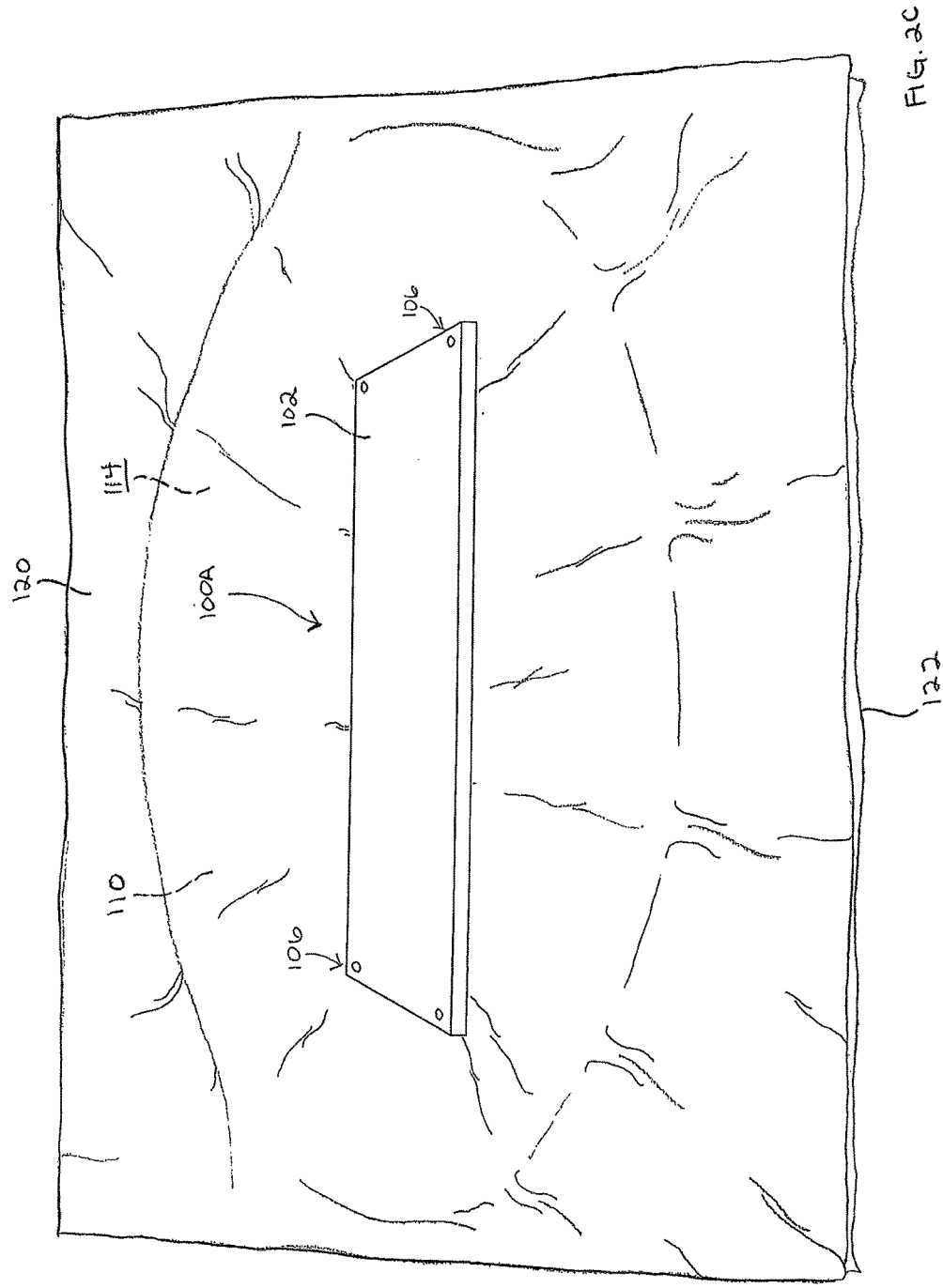

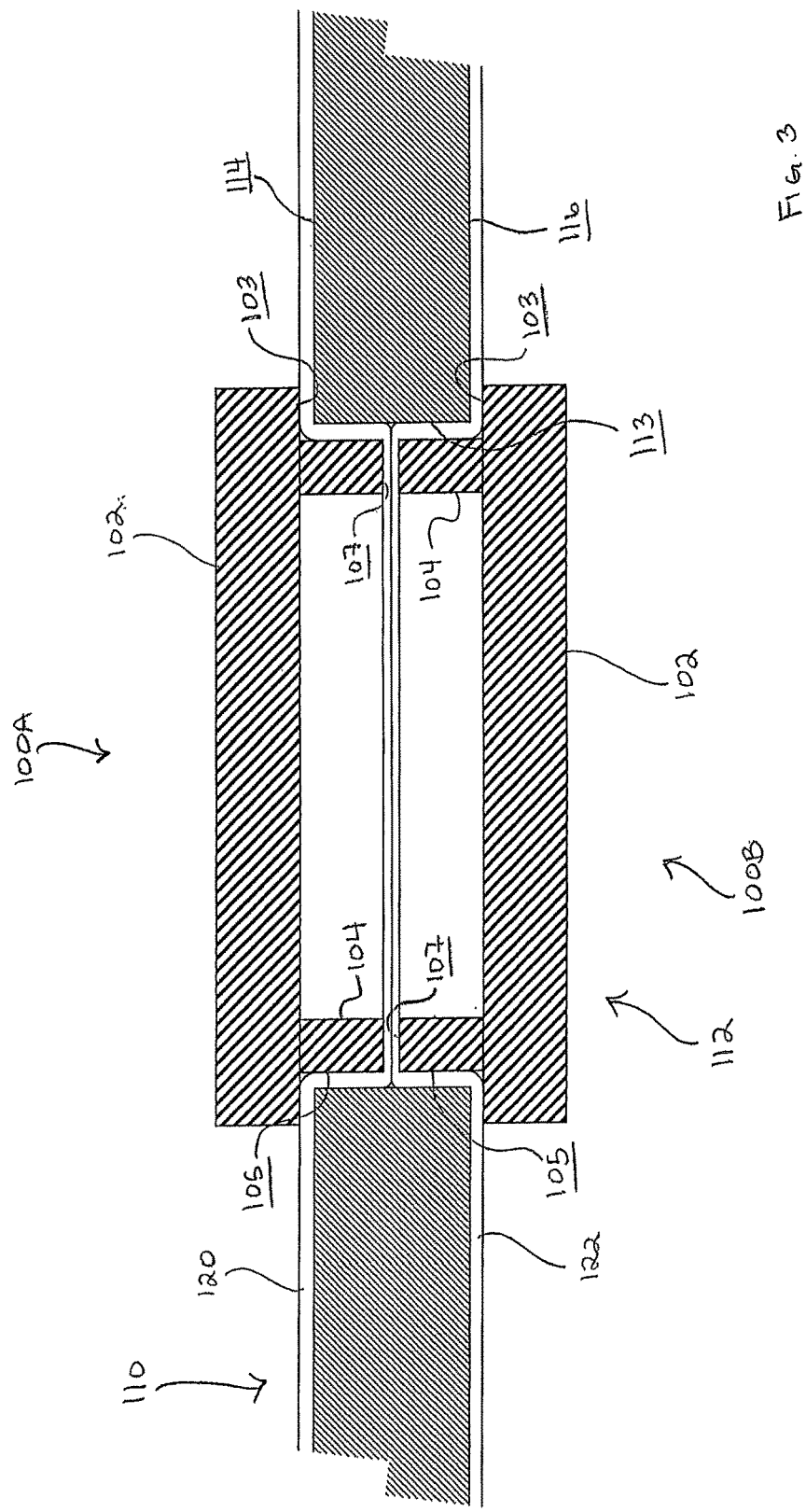

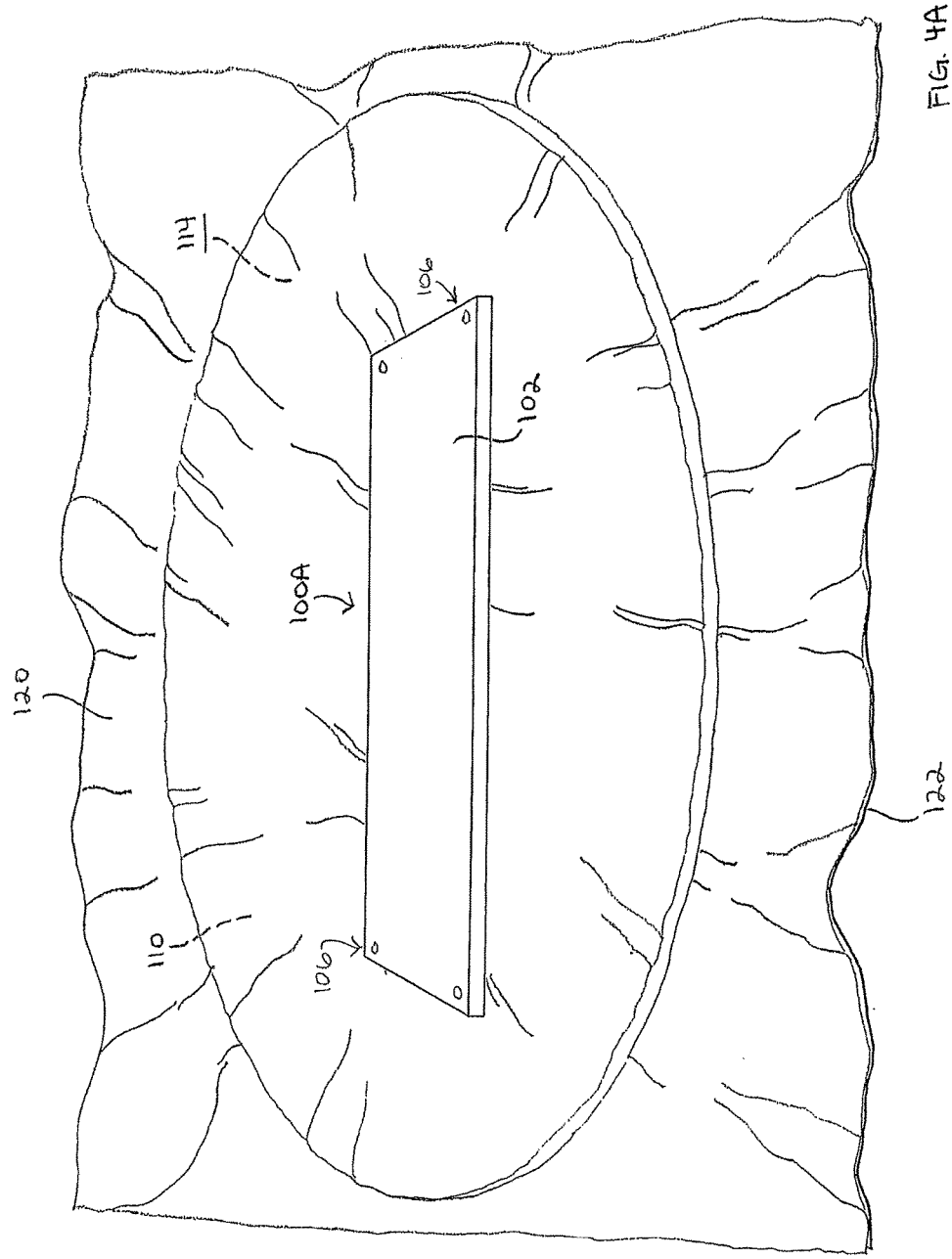

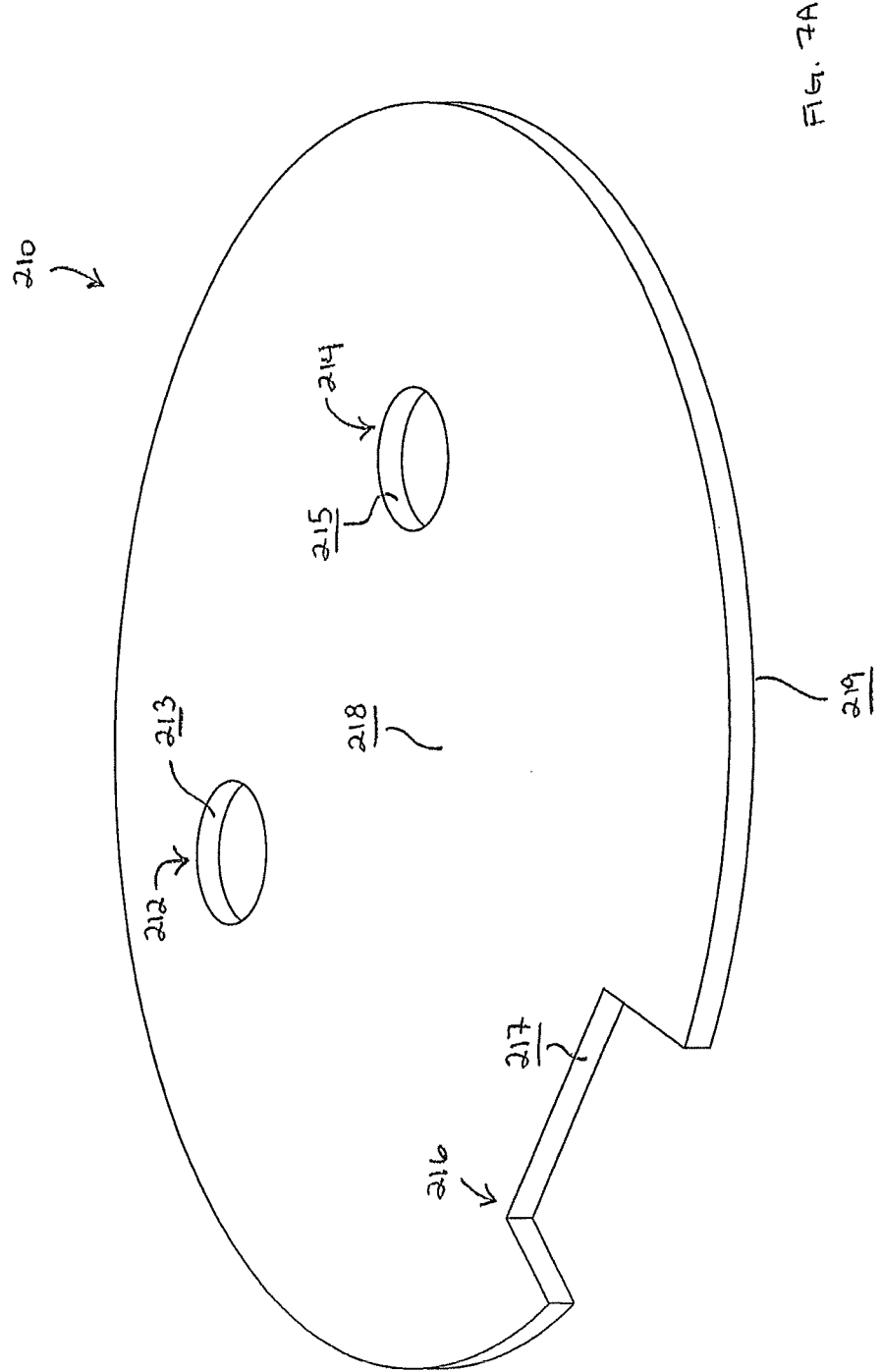

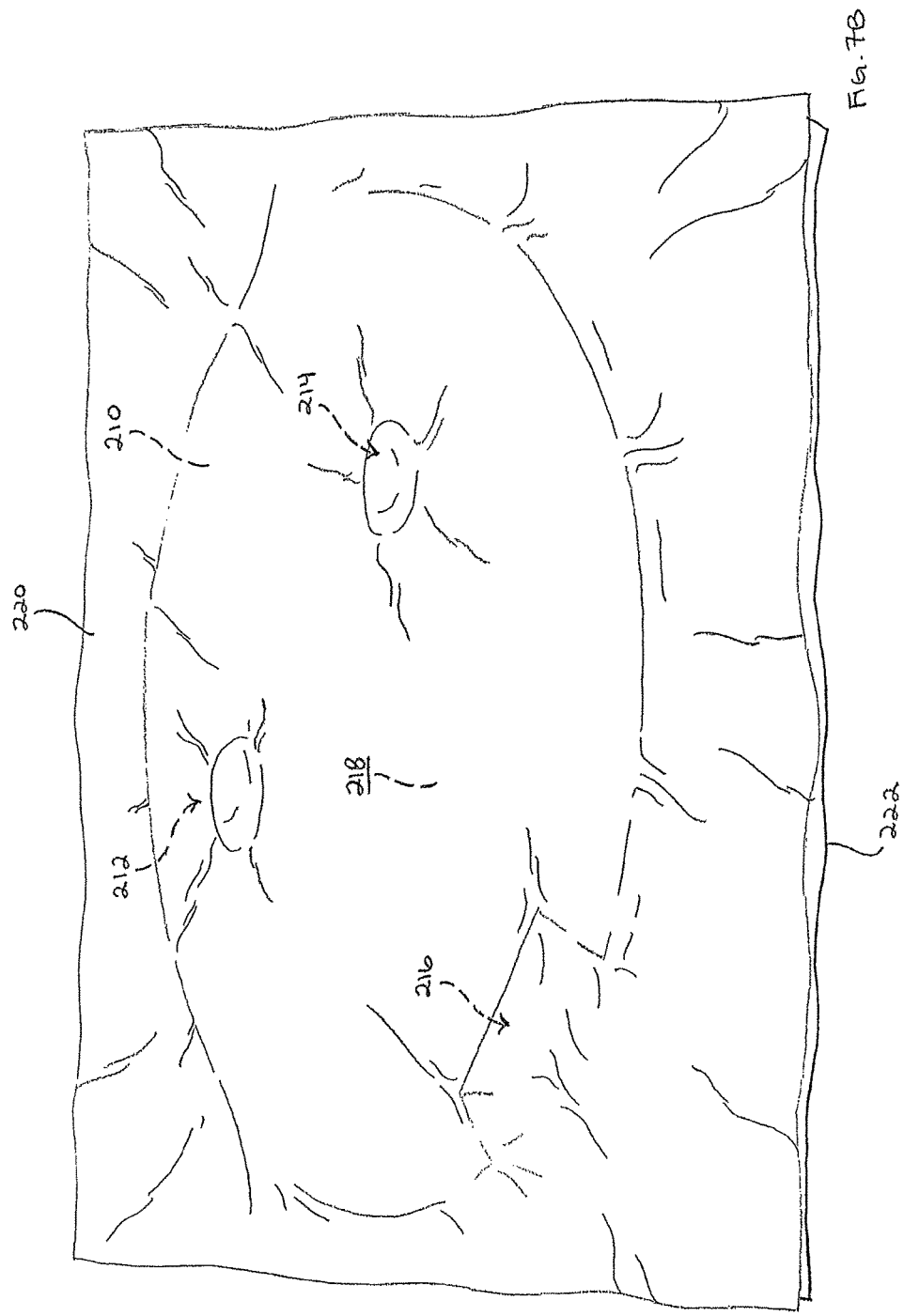

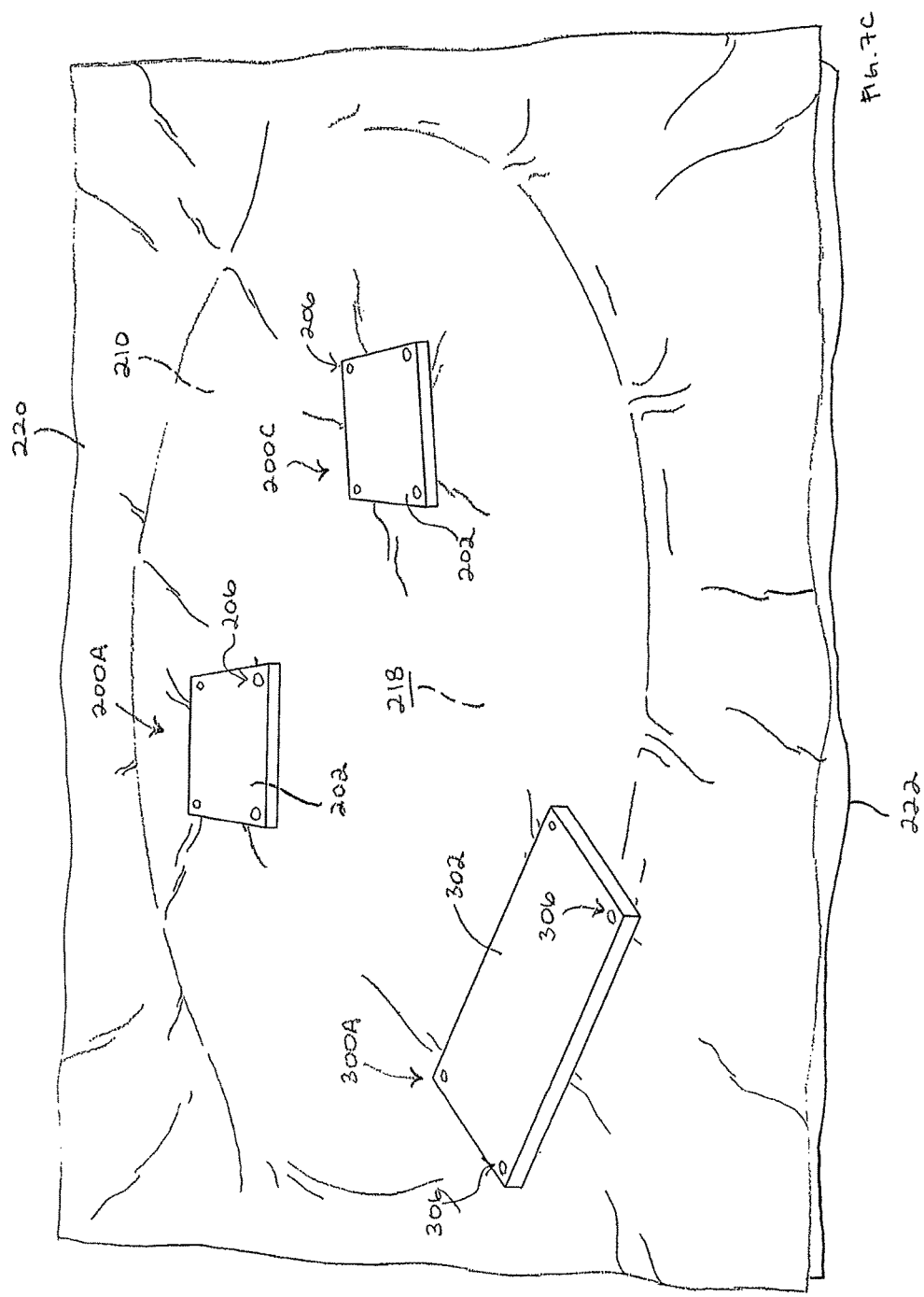

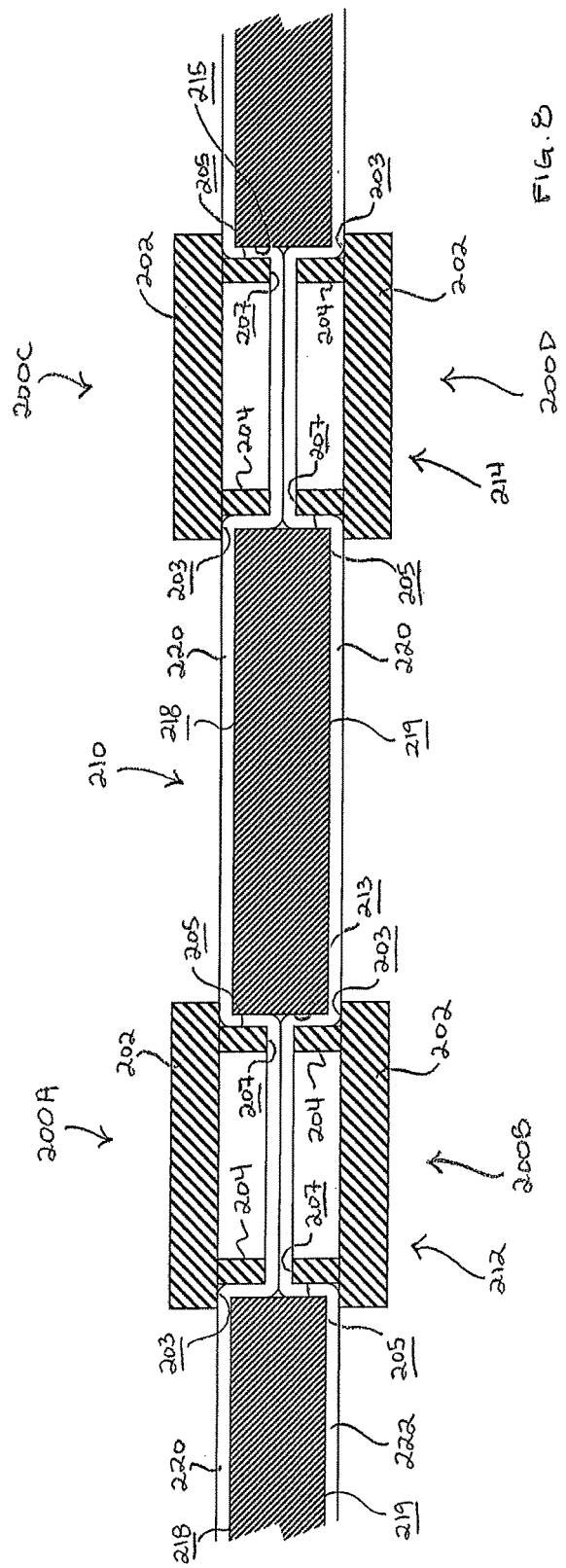

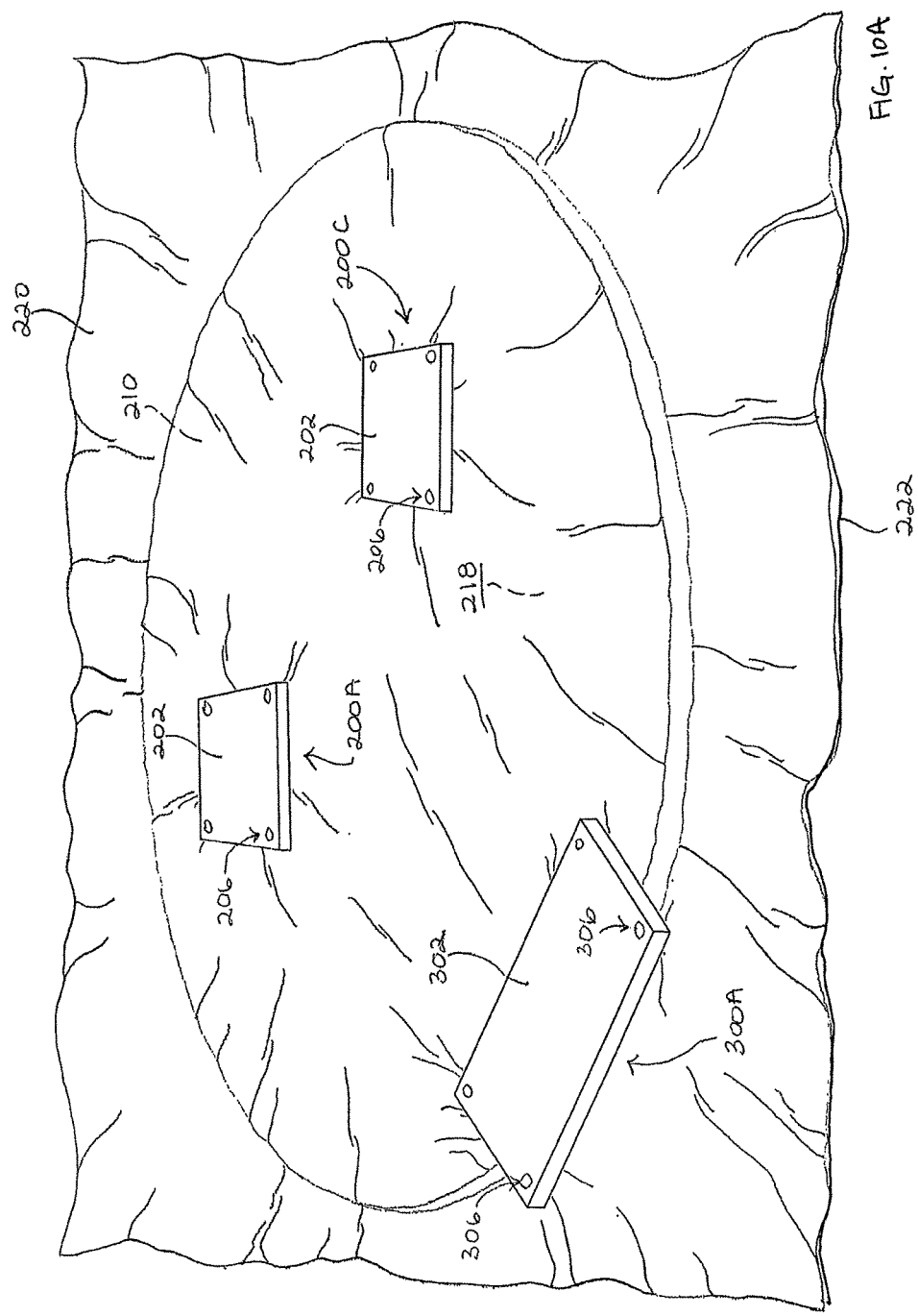

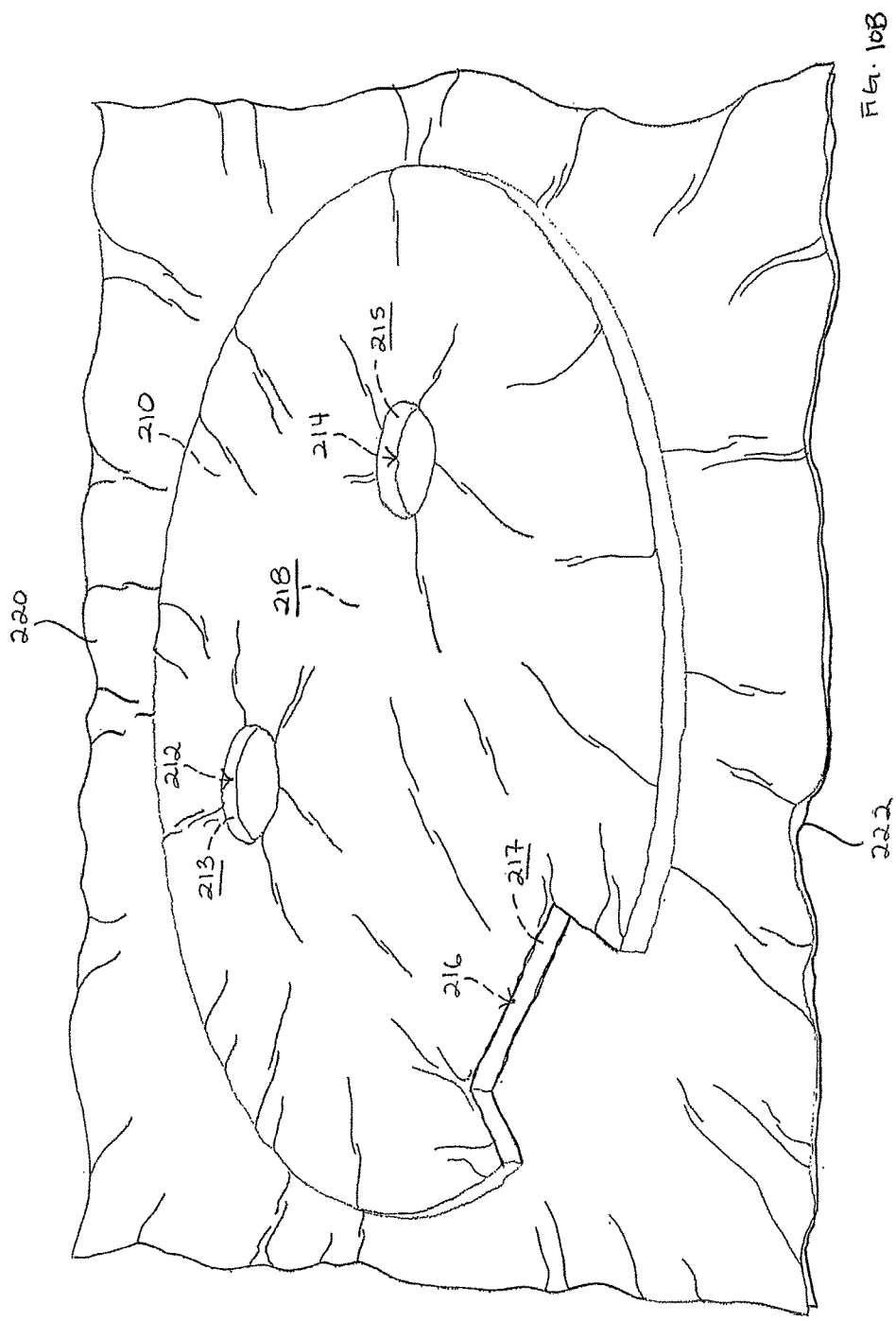

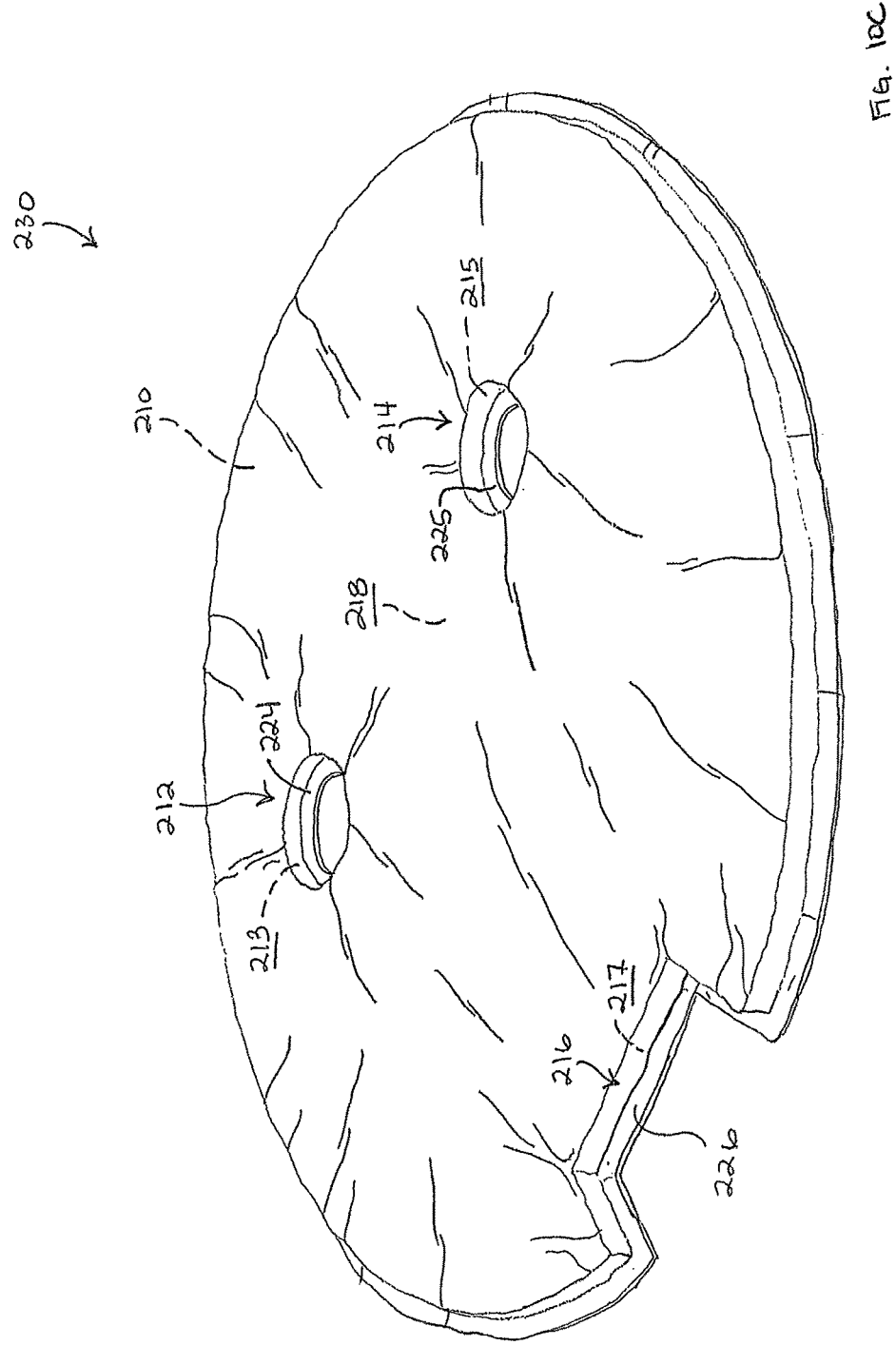

WRINKLE FREE GEOMETRIC OPENING IN A VACUUM INSULATED PANEL

PRIORITY

This application claims priority to U.S. Non-Provisional patent application Ser. No. 14/178,335, entitled "Wrinkle Free Geometric Opening in a Vacuum Insulated Panel," filed Feb. 12, 2014, which in turn claims priority to U.S. Provisional Patent Application No. 61/763,537, entitled "Wrinkle Free Geometric Cutout by Means of Puck'/Filler Design, in a Vacuum Insulated Panel," filed Feb. 12, 2013. The disclosures of U.S. Non-Provisional patent application Ser. No. 14/178,335 and U.S. Provisional Patent Application No. 61/763,537 are incorporated by reference herein.

BACKGROUND

In the transporting or shipment of temperature sensitive materials or items such as blood, plasma, vaccines and certain drugs, it is known to use insulated containers which include heating and/or cooling means as disclosed, for example in U.S. Pat. No. 7,913,511, entitled "Cargo Container for Transporting Temperature Sensitive Items", and issued Mar. 29, 2011; in U.S. Pat. No. 5,950,450, entitled "Containment System for Transporting and Storing Temperature-Sensitive Materials", and issued Sep. 14, 1999; in U.S. Pat. No. 5,943,876, entitled "Insulating Vacuum Panel, Use of Such Panel as Insulating Media and Insulated Containers Employing Such Panel", and issued Aug. 31, 1999; in U.S. Pat. No. 5,483,799, entitled "Temperature Regulated Specimen Transporter", and issued Jan. 16, 1996; and in U.S. Pat. No. 5,603,220, entitled "Electronically Controlled Container for Storing Temperature Sensitive Material", and issued Feb. 18, 1997; the disclosures of which are incorporated by reference herein. When it is desirable to transport or ship a larger volume of temperature sensitive items, it is desirable to provide a cargo container which is adapted to receive a pallet supporting the temperature sensitive items and which also includes cooling and/or heating means for maintaining the temperature sensitive items within a close predetermined temperature range. Such cargo containers are disclosed, for example, in U.S. Pat. No. 5,187,947, entitled "Wheel Type Freezer and Method for Rapid, Low Temperature Freezing", and issued Feb. 23, 1993; and U.S. Pat. No. 6,860,115, entitled "Air-Cargo Container, a Refrigerator Unit for an Air-Cargo Container and a Manufacturing Method of an Air-Cargo Container", and issued Mar. 1, 2005; and in a publication of applicants entitled AcuTemp™ Thermal Pallet Shipper; the disclosures of which are incorporated by reference herein. A Temperature-Controlled, Pallet-Sized Shipping Container is also disclosed in U.S. Pat. Pub. No. 2004/0226309, published Nov. 18, 2004, and the disclosure of which is herein incorporated by reference. This published application claims the benefit of Provisional Pat. Appl'n. No. 60/447,987, filed Feb. 17, 2003, and the disclosure of which is incorporated by reference herein.

In any such cargo container adapted to receive one or more pallets of temperature sensitive items, it may be desirable for the walls and the doors of the cargo container to be insulated with a thermal insulation having a high R-value while minimizing the thickness of the walls and the doors in order to maximize the cargo space and minimize heat transfer to and from the interior of the cargo container. One such type of thermal insulation having a minimal thickness and a high R-value is a vacuum insulated panel ("VIP"). VIPs are known in the art. VIPs may have an R-value between R-30 and R-50. VIPs are generally made by sealing a panel of thermal insulation in a barrier film while subjecting the panel to a vacuum, a process referred to as "evacuating." The barrier film is formed into a pouch into which the panel of thermal insulation is inserted before the panel is evacuated. Upon being evacuated, the panel is contained within the barrier film in an evacuated state by heat sealing the barrier film.

A cargo container may include a rigid housing. The rigid housing may comprise a rigid outer shell and a rigid inner shell. An interior space, into which flat panel insulation cartridges or cassettes may be inserted, is defined between the inner shell and the outer shell. Each cassette includes one or more layers of VIPs which may be separated by a foam insulation sheet and sandwiched between corrugated protective plastic sheets, all of which are wrapped within a plastic film. The cargo container may further include a refrigeration evaporator, an electrical heating element, circulating fans, a refrigeration compressor, storage batteries, and a control system. It may be desirable to provide through bores, cutouts, and/or reliefs within the VIPs such that refrigeration lines, electrical conduit, etc. may be passed there through or therein or such that the VIPs complement contours of the inner shell and/or outer shell. Other features and advantages of the invention will be apparent from the following description, the accompanying drawings, and the appended claims.

In certain instances, it may be desirable to provide VIPs with through bores having particular geometric shapes. In such instances, a through bore may be formed in the panel of thermal insulation prior to being inserted into the film barrier and subject to evacuation. Once inserted into the film barrier, the panel is evacuated which causes the barrier film to fill the void of the through bore in the panel at which time the barrier film is heat sealed. The barrier film within the through bore may then be cut to the desired geometric shape thus defining a through bore in the VIP. Such a method of forming a through bore may cause the barrier film to gather within the void of the through bore and wrinkle and/or crease which can be detrimental the entire VIP. Thus it may be desirable to develop a method of avoiding wrinkling and creasing of the barrier film when forming through bores in VIPs.

It should be understood that the VIPs, and the methods of making VIPs discussed below, should not be construed as being limited to use with cargo containers, and may be used for any other purpose requiring use of an insulating barrier. For instance, VIPs may be used to insulate hot water heaters, refrigerators, freezers, ranges, and/or any other appliance or device. VIPs may also be used to insulate duct, pipes, and/or tubes including, but not limited to, oil pipelines, hot/cold water piping, and/or HVAC ducts. Additionally, VIPs may be used in vehicles (cars, trucks, planes, boats, etc.) to insulate the passenger compartment, trunk, engine compartment, and/or any other part of the vehicle requiring insulation. Other uses for VIPs are well known in the art, and will be further appreciated from the teachings herein.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

FIG. 1 depicts a perspective view of one of a pair of oblong-shaped pucks;

FIG. 2A depicts a perspective view of an insulated core having an oblong-shaped through bore;

FIG. 2B depicts a perspective view of the insulated core of FIG. 2A with barrier film disposed about the insulated core;

FIG. 2C depicts a perspective view of the insulated core of FIG. 2A, with the barrier film of FIG. 2B disposed about the insulated core, and with the pair of pucks of FIG. 1 disposed within the through bore of the insulated core;

FIG. 3 depicts a cross-sectional view of the insulated core of FIG. 2A, with the barrier film of FIG. 2B disposed about the insulated core, and with the pair of pucks of FIG. 1 disposed within the through bore of the insulated core;

FIG. 4A depicts a perspective view of the insulated core of FIG. 2A, with the barrier film of FIG. 2B disposed about the insulated core, with the pair of pucks of FIG. 1 disposed within the through bore of the insulated core, with the insulated core having been exposed to a vacuum, and with the barrier film having been heat-sealed about the insulated core;

FIG. 7A depicts a perspective view of an insulated core having a pair of circle-shaped through bores and a trapezoid-shaped relief;

FIG. 7B depicts a perspective view of the insulated core of FIG. 7A with barrier film disposed about the insulated core;

FIG. 7C depicts a perspective view of the insulated core of FIG. 7A, with the barrier film of FIG. 7B disposed about the insulated core, and with the pairs of pucks of FIGS. 5 and 6 disposed within the through bores and relief of the insulated core;

FIG. 8 depicts a cross-sectional view of the insulated core of FIG. 7A, with the barrier film of FIG. 7B disposed about the insulated core, and with the pairs of pucks of FIGS. 5 and 6 disposed within the through bores and relief of the insulated core;

FIG. 10A depicts a perspective view of the insulated core of FIG. 7A, with the barrier film of FIG. 7B disposed about the insulated core, with the pairs of pucks of FIGS. 5 and 6 disposed within the through bores and relief of the insulated core, with the insulated core having been exposed to a vacuum, and with the barrier film having been heat-sealed about the insulated core;

FIG. 10B depicts a perspective view of the insulated core of FIG. 7A after being subjected to a vacuum and after having the barrier film of FIG. 7B heat-sealed about the insulated core, with the pairs pucks of FIGS. 5 and 6 removed from the through bores and relief of the insulated core; and FIG. 10C depicts a perspective view of the insulated core of FIG. 7A after being subjected to a vacuum and after having the barrier film of FIG. 7B heat-sealed about the insulated core, with an excess of barrier film having been removed.

Figure 4B:
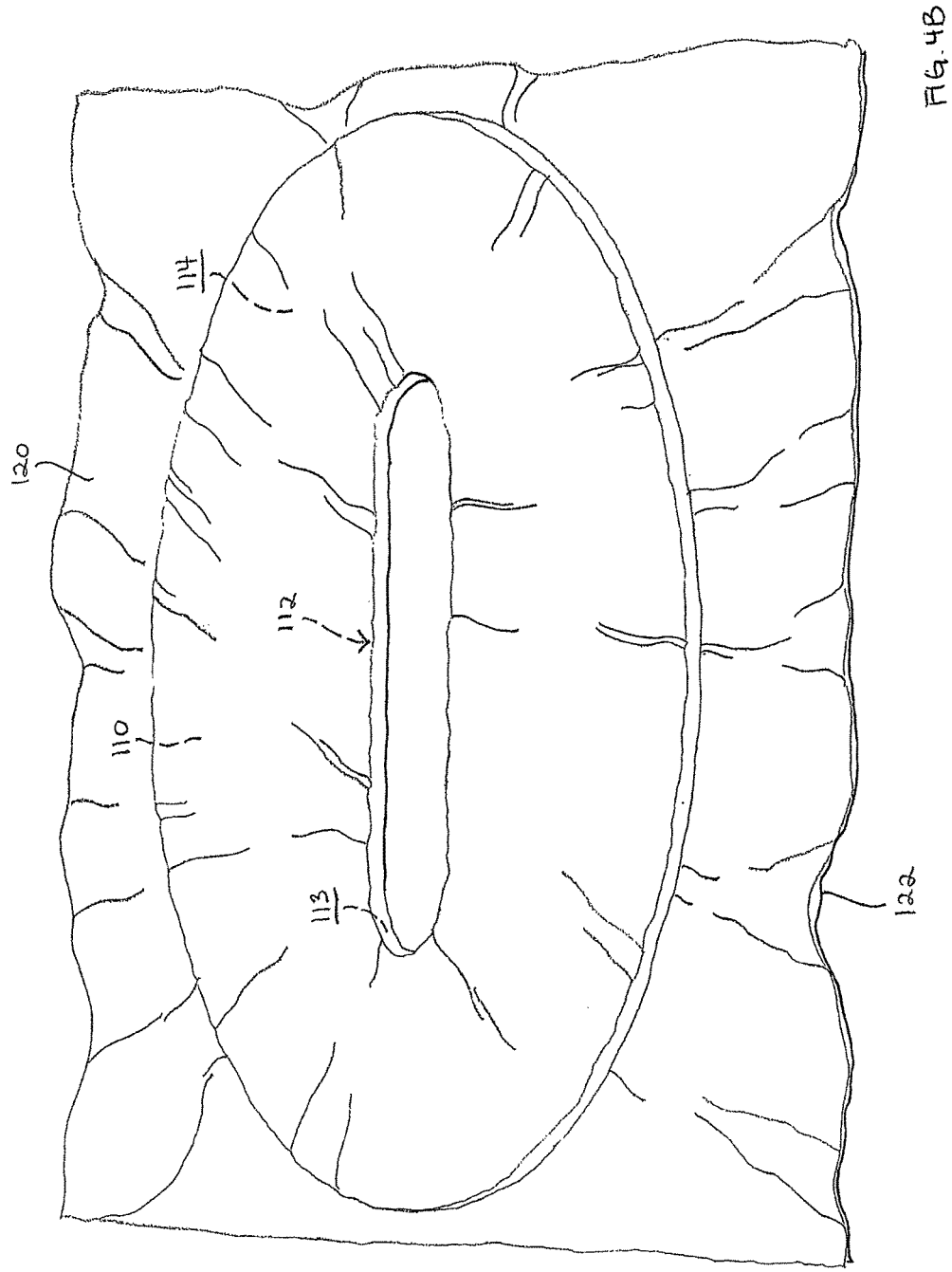
FIG. 4B depicts a perspective view of the insulated core of FIG. 2A after being subjected to a vacuum and having the barrier film of FIG. 2B heat-sealed about the insulated core, with the pair of pucks of FIG. 1 removed from the through bore of the insulated core.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

At least some of the devices and/or methods discussed below may be used to manufacture VIPs to be used in containers constructed in accordance with, or such VIPs discussed below may themselves be constructed and/or operable in accordance with, at least some of the teachings of U.S. Pat. No. 7,913,511; U.S. Pat. No. 5,950,450; U.S. Pat. No. 5,943,876; U.S. Pat. No. 5,483,799; U.S. Pat. No. 5,603,220; U.S. Pat. No. 5,187,947; U.S. Pat. No. 6,860,115; and/or U.S. Pat. Pub. No. 2004/0226309. The disclosures of each of the foregoing patents and publications are incorporated by reference herein. It should be understood that the methods discussed below may used to manufacture VIPs to be used in, or such VIPs discussed below may themselves be constructed and/or operable in accordance with VIPs of the CSafe® RKN containers, the CSafe SVS containers, the CSafe AcuTemp AX27L containers, the CSafe AcuTemp AX56L containers, the CSafe AcuTemp Courier containers, the CSafe AcuTemp PX1L containers, or any other the CSafe packing container(s). Furthermore, the VIPs discussed below may have various structural and functional similarities with those taught in any of the other references that are cited and incorporated by reference herein.

An improved method of manufacturing VIPs includes the following steps. First, providing an insulated core having one or more through bores, cutouts, and/or reliefs (herein-after generally referred to as "openings"). The insulated core may comprise microporous open cell silica aerogel, precipitated silica, fumed silica, glass fiber mats, ceramic fiber mats, and/or open-cell foam, but may comprise any other heat resistant insulating material. As will be understood from the discussion below, the insulated core and the openings formed therein may comprise any shape. A pair of barrier films are disposed about a top surface and a bottom surface of the insulated core to completely envelop the insulated core, including the opening formed therein, between the barrier films. Barrier films for use in VIPs are well-known in the art. The barrier films may comprise a multi-laminate oxygen and water vapor barrier film, but may comprise any other appropriate barrier material.

With barrier films disposed about the insulated core, a first puck is positioned within the opening of the insulated core from a top side of the insulated core, and a second puck is positioned within the opening of the insulated core from a bottom side of the insulated core to thereby capture the barrier films between the pair of pucks. The pucks may comprise any material having sufficient rigidity, weight, and thermal resistance to withstand pressure, movement, and/or heat from "evacuating" and heat sealing the insulated core. As will be understood from the discussion below, it may be desirable to provide pucks with magnetic properties such that the pucks are attracted toward one another. The pucks may comprise a shape substantially similar to the shape of the opening of the insulated core, additionally or alternatively, the pucks may comprise protrusions having a shape substantially similar to the shape of the opening of the insulated core such that insertion of the pucks within the opening may compress the barrier films between the pair of pucks, between the pair of pucks and an interior surface of the opening, and/or between the pair of pucks and the top surface and the bottom surface of the insulated core. Compression of the barrier films in this manner is configured to minimize wrinkles and/or creases within the barrier films in these compressed areas.

At this point, the insulated core is subjected to a vacuum to "evacuate" the insulated core of any gases within any void spaces of the insulated core to thereby reduce potential heat transfer across the insulated core. As the insulated core is subjected to a vacuum, the barrier films are heat sealed around the perimeter of the insulated core to thereby fluidly seal the insulated core in the evacuated state. This evacuation and/or heat sealing may cause wrinkles and/or creases in barrier films particularly around any opening, however, as discussed above, the pair of pucks are configured to minimize wrinkles and/or creases in the barrier films within the above discussed opening. The pucks are then removed from the opening, and the barrier film within the opening is heat sealed. Finally, excess material of the barrier films is then removed to thereby define a substantially wrinkle and/or crease free seal extending inwardly from the interior surface the opening.

I. Exemplary Puck to Reduce Wrinkles and/or Creases Within IP Barrier Films

FIGS. 1-4C illustrate an exemplary puck (100) and method of using puck (100) to manufacture VIPs to avoid wrinkling and/or creasing of a barrier film used to enclose an insulated core. FIG. 1 shows a puck (100) having a base (102) and an oblong-shaped protrusion (104) extending from a top surface (103) of base (102). Base (102) comprises a plurality of through bores (106). Although puck (100) of the present example comprises an oblong-shaped protrusion (104), it will be appreciated from the discussion below that puck (100) may comprise a protrusion having any other required shape (square, rectangular, triangular, etc.).

FIGS. 2A-4C show the steps required to manufacture a VIP (130) using puck (100). FIG. 2A shows a circular-shaped insulated core (110) having an oblong-shaped through bore (112). Although insulated core (110) of the present example is circular-shaped, it should be understood that insulated core (110) may comprise any other required shape (square, rectangular, triangular, etc.). Also, although insulated core (110) of the present example comprises an oblong-shaped through bore (112), it will be appreciated from the discussion below that through bore (112) may comprise any other required shape (square, rectangular, triangular, etc.). As shown in FIG. 2B, a pair of barrier films (120, 122) are disposed adjacent to a top surface (114) and a bottom surface (116) of insulated core (110).

As shown in FIGS. 2C and 3, with barrier films (120, 122) disposed adjacent to top surface (114) and bottom surface (116) of insulated core (110), a first puck (100A), constructed according to the above discussion regarding puck (100) but referred to as first puck (100A) for the sake of clarity, is positioned downwardly within through bore (112) such that top surface (103) of base (102) of first puck (100A) rests on or close to top surface (114) of insulated core (110) with barrier film (120) disposed there between. At the same time, a second puck (100B), constructed according to the above discussion regarding puck (100) but referred to as second puck (100B) for the sake of clarity, is positioned upwardly within through bore (112) such that bottom surface (116) of insulated core (110) rests on or close to top surface (103) of base (102) of second puck (100B) with barrier film (122) disposed there between. As shown in FIG. 3, oblong-shaped protrusion (104) is sized such that with first puck (100A) and second puck (100B) disposed within through bore (112), barrier films (120, 122) are compressed between a top surface (107) of oblong-shaped protrusions (104) of pucks (100A, 100B). It should be appreciated that with barrier films (120, 122) compressed between top surfaces (107) of oblong-shaped protrusions (104) of pucks (100A, 100B), wrinkles and/or creases in barrier films (120, 122) will be minimized within this compressed area.

As shown in FIG. 3, oblong-shaped protrusions (104) of pucks (100A, 100B), and in general puck (100), may further be sized such that with pucks (100A, 100B) disposed within through bore (112) of insulated core (110), an exterior surface (105) of oblong-shaped protrusions (104) rests on or close to an interior surface (113) of through bore (112). Thus, with first puck (100A) and second puck (100B) disposed within through bore (112), exterior surfaces (105) of oblong-shaped protrusions (104) may compress barrier films (120, 122) between exterior surface (105) of oblong-shaped protrusions (104) and interior surface (113) of through bore (112) to thereby minimize wrinkles and/or creases in barrier films (120, 122) within this compressed area.

Also as shown in FIG. 3, oblong-shaped protrusions (104) of pucks (100A, 100B), and in general puck (100), may further be sized such that with pucks (100A, 100B) disposed within through bore (112) of insulated core (110), top surfaces (103) of bases (102) of pucks (100A, 100B) rest on or close to top surface (114) of insulated core (110) and bottom surface (116) of insulated core (110) respectively. Thus, with first puck (100A) and second puck (100B) disposed within through bore (112), top surfaces (103) of bases (102) of pucks (100A, 100B) may compress barrier films (120, 122) between top surfaces (103) of bases (102) and top surface (114) of insulated core (110) and bottom surface (116) of insulated core (110) to thereby minimize wrinkles and/or creases in barrier films (120, 122) within these compressed areas.

Figure 4C:
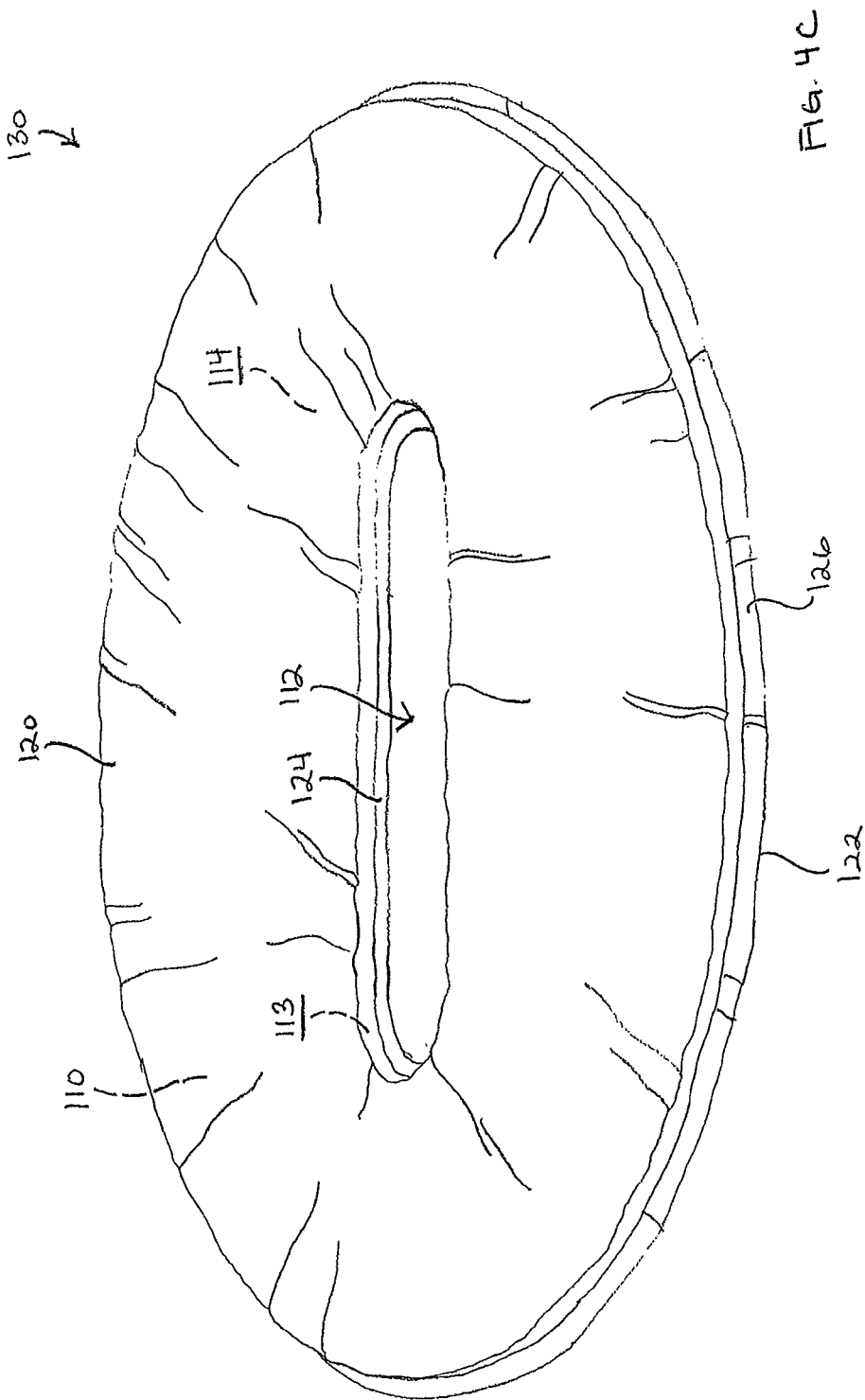
FIG. 4C depicts a perspective view of the insulated core of FIG. 2A after being subjected to a vacuum and after having the barrier film of FIG. 2B heat-sealed about the insulated core, with an excess of barrier film having been removed.

At this point, and as shown in FIG. 4A, insulated core (110) is subjected to a vacuum to evacuate insulated core (110) of gases within any void spaces of insulated core (110) to thereby reduce heat transfer across insulated core (110). As insulated core (110) is subjected to a vacuum, barrier films (120, 122) are heat sealed to thereby fluidly seal insulated core (110) in the evacuated state. This evacuation and heat sealing may cause wrinkles and/or creases in barrier films (120, 122), however, as discussed above, pucks (100A, 100B) are configured to minimize wrinkles and/or creases in barrier films (120, 122) within the above discussed compressed areas. Pucks (100A, 100B) are then removed from through bore (112) as shown in FIG. 4B, and barrier films (120, 122) within through bore (112) are heat sealed to thereby form a fluid seal within through bore (112). Finally, excess material of barrier films (120, 122) is then removed to thereby define a seal (124) extending inwardly from interior surface (113) of through bore (112) and a seal (126) extending outwardly from insulated core (110) as shown in FIG. 4C.

Figure 5:
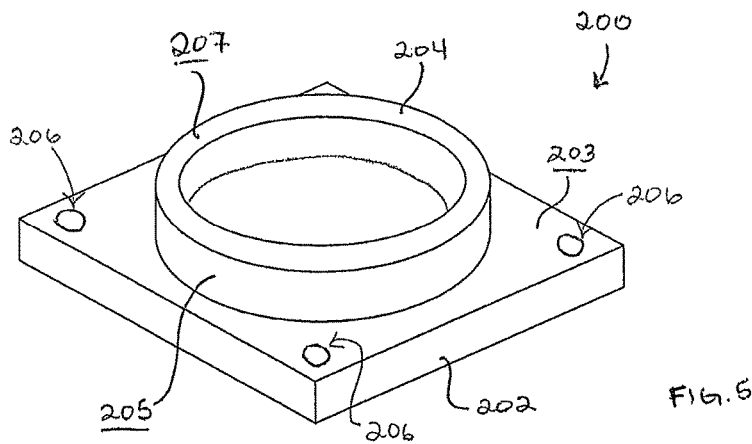
FIG. 5 depicts a perspective view of one of a pair of circle-shaped pucks.
Figure 6:
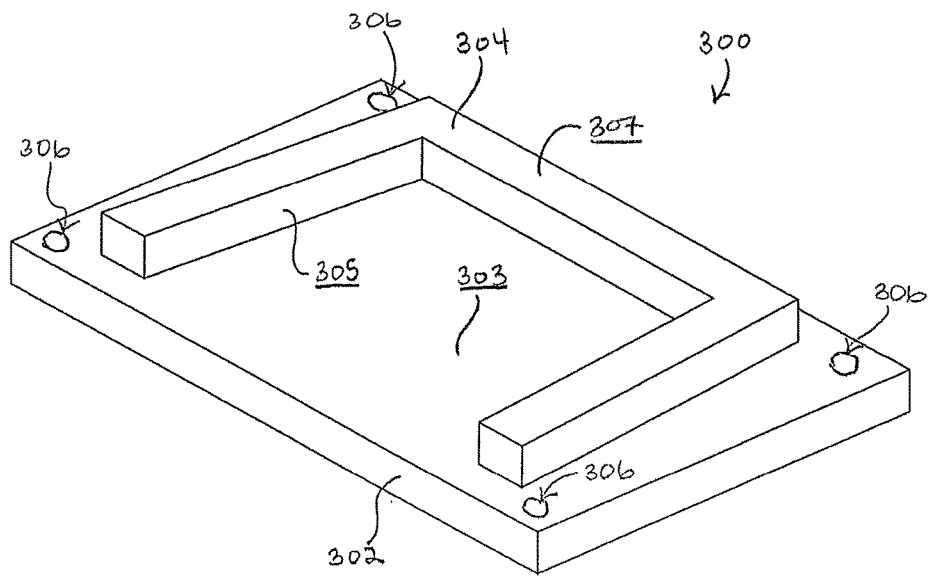
FIG. 6 depicts a perspective view of one of a pair of trapezoid-shaped pucks.

II. Exemplary Alternative Puck to Reduce Wrinkles and/or Creases Within VIP Barrier Films FIGS. 5-10C illustrate a pair of exemplary alternative pucks (200, 300) and a method of using pucks (200, 300) to manufacture VIPs to avoid wrinkling and/or creasing of a barrier film used to enclose an insulated core. FIG. 5 shows a puck (200) having a base (202) and a circular-shaped protrusion (204) extending from a top surface (203) of base (202). Base (202) comprises a plurality of through bores (206). Although puck (200) of the present example comprises a circular-shaped protrusion (204), it will be appreciated from the discussion below that puck (200) may comprise a protrusion having any other required shape (square, rectangular, triangular, etc.). FIG. 6 shows a puck (300) having a base (302) and a partial trapezoid-shaped protrusion (304) extending from a top surface (303) of base (302). Base (302) comprises a plurality of through bores (306). Although puck (300) of the present example comprises a trapezoid-shaped protrusion (304), it will be appreciated from the discussion below that puck (300) may comprise a protrusion having any other required shape (square, rectangular, triangular, etc.).

FIGS. 7A-10C show the steps required to manufacture a VIP (230) using pucks (200, 300). FIG. 7A shows a circular-shaped insulated core (210) having a pair of circular-shaped through bores (212, 214). Although insulated core (210) of the present example is circular-shaped, it should be understood that insulated core (210) may comprise any other required shape (square, rectangular, triangular, etc.). Also, although insulated core (210) of the present example comprises a pair of circular-shaped through bores (212, 214), it will be appreciated from the discussion below that through bores (212, 214) may comprise any other required shape (square, rectangular, triangular, etc.). Circular-shaped insulated core (210) further comprises a trapezoid-shaped relief (216). Although insulated core (210) of the present example comprises a trapezoid-shaped relief (216), it will be appreciated from the discussion below that relief (216) may comprise any other required shape (square, rectangular, triangular, etc.). As shown in FIG. 7B, a pair of barrier films (220, 222) are disposed adjacent to a top surface (218) and a bottom surface (219) of insulated core (210).

As shown in FIGS. 7C and 8, with barrier films (220, 222) disposed adjacent to top surface (218) and bottom surface (219) of insulated core (210), a first puck (200A), constructed according to the above discussion regarding puck (200) but referred to as first puck (200A) for the sake of clarity, is positioned downwardly within through bore (212) such that top surface (203) of base (202) of first puck (200A) rests on or close to top surface (218) of insulated core (210) with barrier film (220) disposed there between. A second puck (200B), constructed according to the above discussion regarding puck (200) but referred to as second puck (200B) for the sake of clarity, is positioned upwardly within through bore (212) such that bottom surface (219) of insulated core (210) rests no or close to top surface (203) of base (202) of second puck (200B) with barrier film (222) disposed there between. At the same time, a third puck (200C), constructed according to the above discussion regarding puck (200) but referred to as third puck (200C) for the sake of clarity, is positioned downwardly within through bore (214) such that top surface (203) of base (202) of third puck (200C) rests on or close to top surface (218) of insulated core (210) with barrier film (220) disposed there between. A fourth puck (200D), constructed according to the above discussion regarding puck (200) but referred to as fourth puck (200D) for the sake of clarity, is positioned upwardly within through bore (214) such that bottom surface (219) of insulated core (210) rests on or close to top surface (203) of base (202) of fourth puck (200D) with barrier film (222) disposed there between.

As shown in FIG. 8, circular-shaped protrusion (204) is sized such that with first puck (200A) and second puck (200B) disposed within through bore (212), and with third puck (200C) and fourth puck (200D) disposed within through bore (214), barrier films (220, 222) are compressed between top surfaces (207) of circular-shaped protrusions (204) of pucks (200A, 200B, 200C, 200D). It should be appreciated that with barrier films (220, 222) compressed between top surfaces (207) of circular-shaped protrusions (204) of pucks (200A, 200B, 200C, 200D), wrinkles and/or creases in barrier films (220, 222) will be minimized within this compressed area.

As shown in FIG. 8, circular-shaped protrusions (204) of pucks (200A, 200B, 200C, 200D), and in general puck (200), may further be sized such that with pucks (200A, 200B, 200C, 200D) disposed within through bores (212, 214) of insulated core (210), an exterior surface (204) of circular-shaped protrusions (204) rests on or close to an interior surface (213) of through bore (212) and an interior surface (215) of through bore (214). Thus, with first puck (200A) and second puck (200B) disposed within through bore (212), and with third puck (200C) and fourth puck (200D) disposed within through bore (214), exterior surfaces (205) of circular-shaped protrusions (204) may compress barrier films (220, 222) between exterior surface (205) of circular-shaped protrusions (204) and interior surfaces (213, 215) of through bores (212, 214) to thereby minimize wrinkles and/or creases in barrier films (120, 122) within this compressed area.

Also as shown in FIG. 8, circular-shaped protrusions (204) of pucks (200A, 200B, 200C, 200D), and in general puck (200), may further be sized such that with pucks (200A, 200B, 200C, 200D) disposed within through bores (212, 214) of insulated core (210), top surfaces (203) of bases (202) of pucks (200A, 200B, 200C, 200D) rest on or close to top surface (218) of insulated core (210) and bottom surface (219) of insulated core (210) respectively. Thus, with first puck (200A) and second puck (200B) disposed within through bore (212), and with third puck (200C) and fourth puck (200D) disposed within through bore (214), top surfaces (203) of bases (202) of pucks (200A, 200B, 200C, 200D) may compress barrier films (220, 222) between top surfaces (203) of bases (202) and top surface (218) of insulated core (210) and bottom surface (219) of insulated core (210) to thereby minimize wrinkles and/or creases in barrier films (220, 222) within these compressed areas.

Figure 9:
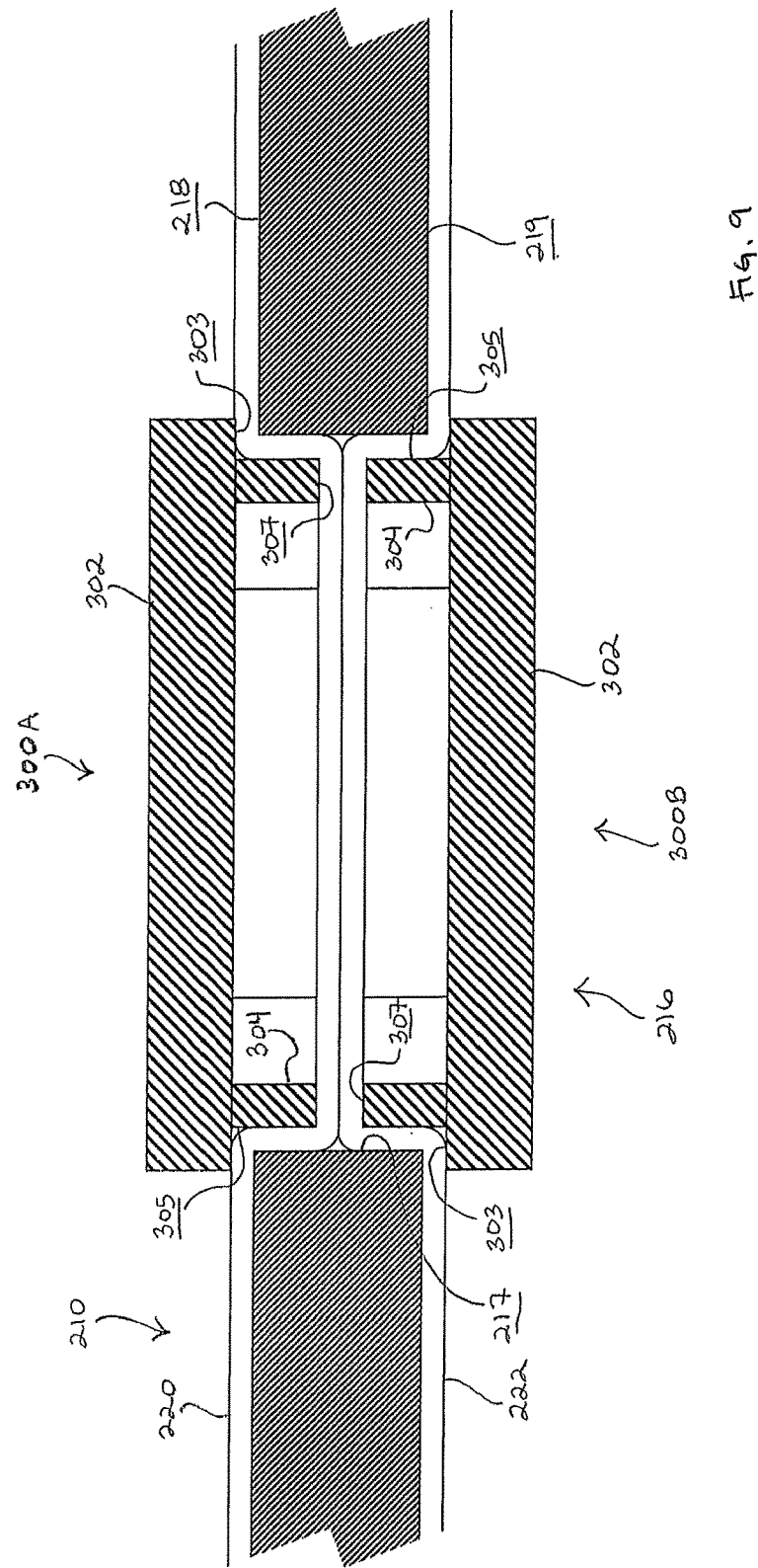
FIG. 9 depicts another cross-sectional view of the insulated core of FIG. 7A, with the barrier film of FIG. 7B disposed about the insulated core, and with the pairs of pucks of FIGS. 5 and 6 disposed within the through bores and relief of the insulated core.

As shown in FIGS. 7C and 9, with barrier films (220, 222) disposed adjacent to top surface (218) and bottom surface (219) of insulated core (210), a first puck (300A), constructed according to the above discussion regarding puck (300) but referred to as first puck (300A) for the sake of clarity, is positioned downwardly within relief (216) such that top surface (303) of base (303) of first puck (300A) rests on or close to top surface (218) of insulated core (210) with barrier film (220) disposed there between. At the same time, a second puck (300B), constructed according to the above discussion regarding puck (300) but referred to as second puck (300B) for the sake of clarity, is positioned upwardly within relief (216) such that bottom surface (219) of insulated core (210) rests on or close to top surface (303) of base (302) of second puck (300B) with barrier film (222) disposed there between. As shown in FIG. 9, trapezoid-shaped protrusion (304) is sized such that with first puck (300A) and second puck (300B) disposed within relief (216), barrier films (220, 222) are compressed between a top surface (307) of trapezoid-shaped protrusions (304) of pucks (300A, 300B). It should be appreciated that with barrier films (220, 222) compressed between top surfaces (307) of trapezoid-shaped protrusions (304) of pucks (300A, 300B), wrinkles and/or creases in barrier films (220, 222) will be minimized within this compressed area.

As shown in FIG. 9, trapezoid-shaped protrusions (304) of pucks (300A, 300B), and in general puck (300), may further be sized such that with pucks (300A, 300B) disposed within relief (216) of insulated core (210), an exterior surface (305) of trapezoid-shaped protrusions (304) rests on or close to an interior surface (217) of relief (216). Thus, with first puck (300A) and second puck (300B) disposed within relief (216), exterior surfaces (305) of trapezoid-shaped protrusions (304) may compress barrier films (220, 222) between exterior surface (305) of trapezoid-shaped protrusions (304) and interior surface (217) of relief (216) to thereby minimize wrinkles and/or creases in barrier films (220, 222) within this compressed area.

Also as shown in FIG. 9, trapezoid-shaped protrusions (304) of pucks (300A, 300B), and in general puck (300), may further be sized such that with pucks (300A, 300B) disposed within relief (216) of insulated core (210), top surfaces (303) of bases (302) of pucks (300A, 300B) rest on or close to top surface (218) of insulated core (210) and bottom surface (219) of insulated core (210) respectively. Thus, with first puck (300A) and second puck (300B) disposed within relief (216), top surfaces (303) of bases (302) of pucks (300A, 300B) may compress barrier films (220, 222) between top surfaces (303) of bases (302) and top surface (218) of insulated core (210) and bottom surface (219) of insulated core (210) to thereby minimize wrinkles and/or creases in barrier films (220, 222) within these compressed areas.

At this point, and as shown in FIG. 10A, insulated core (210) is subjected to a vacuum to evacuate insulated core (210) of gases within any void spaces of insulated core (210) to thereby reduce heat transfer across insulated core (210). As insulated core (210) is subjected to a vacuum, barrier films (220, 222) are heat sealed to thereby fluidly seal insulated core (210) in the evacuated state. This evacuation and heat sealing may cause wrinkles and/or creases in barrier films (220, 222); however, as discussed above, pucks (200A, 200B, 200C, 200D, 300A, 300B) are configured to minimize wrinkles and/or creases in barrier films (220, 222) within the above discussed compressed areas. Pucks (200A, 200B, 200C, 200D, 300A, 300B) are then removed from through bores (212, 214) and relief (216) as shown in FIG. 10B, and barrier films (220, 222) within through bores (212, 214) and relief (216) are heat sealed to thereby form a fluid seal within through bores (212, 214) and relief (216). Finally, excess material of barrier films (220, 222) is then removed to thereby define a seal (224, 225) extending inwardly from interior surfaces (213, 215) of through bores (212, 214) and a seal (226) extending inwardly from interior surface (217) of relief (216) and outwardly from insulated core (210) as shown in FIG. 10C.

It should be understood that although the embodiments of pucks (100, 200, 300) discussed above were discussed as being used in pairs, it should be understood that in certain versions of VIPs (130, 230) it may be desirable to use pucks (100, 200, 300) singularly. For instance, although VIPs (130, 230) discussed above are described as comprising through bores (112, 212, 214) and/or relief (216) that pass completely through insulate cores (110, 210), it should be appreciated that a relief (not shown) may be formed in top surfaces (114, 218) and/or bottom surfaces (116, 219) of insulated cores (110, 210) that passes only partially through insulated cores (110, 210). A single puck (100, 200, 300) may then be positioned within this relief to thereby compress barrier film against a bottom surface and/or interior side surfaces of the relief to thereby minimize wrinkles and/or creases in the barrier film within this relief.

Furthermore, protrusions (104, 204, 304) of pucks (100, 200, 300) may be sufficiently thick to pass completely through through bores (112, 212, 214) and/or relief (216) such that barrier film may be compressed between top surfaces (107, 207, 307) of protrusions (104, 204, 304) and a surface upon which insulated cores (110, 210) rest such that a single puck (100, 200, 300) may be used.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. An apparatus for minimizing wrinkles and/or creases in barrier film of a vacuum insulated panel comprising an insulated core, the apparatus comprising:
 (a) a first puck, wherein the first puck comprises:
  (i) a base, wherein the base of the first puck comprises a top surface and a bottom surface, and
  (ii) a protrusion, wherein the protrusion of the first puck extends from the top surface of the base of the first puck, wherein the protrusion of the first puck comprises a top surface and an exterior surface, wherein the exterior surface of the protrusion of the first puck defines a first shape selected from the group of an oblong shape or a partial trapezoid shape; and (b) a second puck, wherein the second puck comprises:
  (i) a base, wherein the base of the second puck comprises a top surface and a bottom surface, and
  (ii) a protrusion, wherein the protrusion of the second puck extends from the top surface of the base of the second puck, wherein the protrusion of the second puck comprises a top surface and an exterior surface, wherein the exterior surface of the protrusion of the second puck defines a second shape selected from the group of an oblong shape or a partial trapezoid shape;
wherein the first puck and the second puck are configured to:
  1. fit within an opening of a hole through the insulated core;
  2. compress at least one barrier film disposed within the opening of the hole through the insulated core between the top surface of the protrusion of the first puck and the top surface of the protrusion of the second puck to produce at least one compressed barrier film; and
  3. minimize wrinkles and/or creases within the at least one compressed barrier film.

2. The apparatus of claim 1, wherein the first shape and the second shape comprise the same shape.

3. The apparatus of claim 1, wherein the protrusion of the first puck and the protrusion of the second puck each define an interior void.

4. The apparatus of claim 1, wherein the first shape and the second shape correlate to the shape of an opening into which the first puck and the second puck are inserted.

5. The apparatus of claim 1, wherein the top surface of the base of the first puck and the top surface of the base of the second puck are configured to compress the at least one barrier film between the top surfaces and at least one other surface.

6. The apparatus of claim 1, wherein the exterior surface of the protrusion of the first puck and the exterior surface of the protrusion of the second puck are configured to compress the at least one barrier film between the exterior surfaces and at least one other surface.

7. The apparatus of claim 1, wherein the at least one barrier film comprises a first barrier film and a second barrier film.

8. An apparatus for minimizing wrinkles and/or creases in barrier film of a vacuum insulated panel, the apparatus comprising:
(a) a free-standing first puck, wherein the first puck comprises:
  (i) a base, wherein the base of the first puck comprises a top surface and a bottom surface, and
  (ii) a protrusion, wherein the protrusion of the first puck extends from the top surface of the base of the first puck, wherein the protrusion of the first puck comprises a top surface and an exterior surface, wherein the exterior surface of the protrusion of the first puck defines a first shape selected from the group of an oblong shape or a partial trapezoid shape; and
(b) a free-standing second puck, wherein the second puck comprises:
  (i) a base, wherein the base of the second puck comprises a top surface and a bottom surface, and
  (ii) a protrusion, wherein the protrusion of the second puck extends from the top surface of the base of the second puck, wherein the protrusion of the second puck comprises a top surface and an exterior surface, wherein the exterior surface of the protrusion of the second puck defines a second shape selected from the group of an oblong shape or a partial trapezoid shape;
wherein the first puck and the second puck are oriented such that at least one barrier film is configured to be compressed between the top surface of the protrusion of the first puck and the top surface of the protrusion of the second puck to thereby minimize wrinkles and/or creases within the at least one barrier film.

* * * * *